(12) United States Patent
Yang et al.

(10) Patent No.: US 9,396,557 B2
(45) Date of Patent: Jul. 19, 2016

(54) APPARATUS AND METHOD FOR ENCODING IMAGE DATA

(71) Applicant: SAMSUNG DISPLAY CO., LTD., Yongin, Gyeonggi-Do (KR)

(72) Inventors: Ji-Yeon Yang, Yongin (KR); Byung-Hyun Kim, Yongin (KR); Geun-Young Jeong, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/520,516

(22) Filed: Oct. 22, 2014

(65) Prior Publication Data

US 2015/0117774 A1 Apr. 30, 2015

(30) Foreign Application Priority Data

Oct. 30, 2013 (KR) .................. 10-2013-0130275

(51) Int. Cl.
| | | |
|---|---|---|
| *G06K 9/00* | (2006.01) | |
| *G06T 9/00* | (2006.01) | |
| *G06T 11/00* | (2006.01) | |
| *G09G 3/20* | (2006.01) | |

(52) U.S. Cl.
CPC .................. *G06T 9/00* (2013.01); *G06T 11/001* (2013.01); *G09G 3/2003* (2013.01); *G06T 2210/08* (2013.01); *G06T 2210/32* (2013.01); *G09G 2300/0452* (2013.01); *G09G 2360/16* (2013.01)

(58) Field of Classification Search
CPC . H04N 7/50; H04N 7/26244; H04N 7/26313; H04N 7/30; H04N 7/26335; H04N 7/26079; H04N 1/64; H04N 7/26292; H04N 7/26148; G06T 9/005

USPC ......................................................... 382/166
See application file for complete search history.

(56) References Cited

U.S. PATENT DOCUMENTS

| | | |
|---|---|---|
| 4,698,672 A | 10/1987 | Chen et al. |
| 5,973,740 A | 10/1999 | Hrusecky |
| 2002/0167596 A1 | 11/2002 | Suzuki et al. |
| 2003/0222998 A1 | 12/2003 | Yamauchi et al. |

(Continued)

FOREIGN PATENT DOCUMENTS

| | | |
|---|---|---|
| JP | 10-108202 A | 4/1998 |
| KR | 10-2011-0123531 A | 11/2011 |

(Continued)

OTHER PUBLICATIONS

US Office Action Dated Dec. 14, 2015.

*Primary Examiner* — Duy M Dang
(74) *Attorney, Agent, or Firm* — Lee & Morse, P.C.

(57) ABSTRACT

An apparatus for encoding an image data includes a sub-pixel rendering unit configured to convert a first image data of a RGB type, supplied from an outside thereof, into a second image data of a RG-BG type by performing sub-pixel rendering on the first image data, a first differential pulse code modulation (DPCM) processing unit configured to generate a first differential data including a differential value between gray scale values corresponding to green sub-pixels in the second image data, and a second DPCM processing unit configured to generate a second differential data including a differential value between a gray scale value corresponding to a red or blue sub-pixel in the second image data and an average value of gray scale values corresponding to green sub-pixels adjacent to the red or blue sub-pixel.

13 Claims, 3 Drawing Sheets

(56) References Cited

U.S. PATENT DOCUMENTS

| | | |
|---|---|---|
| 2007/0025630 A1 | 2/2007 | Sung et al. |
| 2008/0107349 A1 | 5/2008 | Sung et al. |
| 2008/0285884 A1 | 11/2008 | Nishijima |
| 2011/0058064 A1 | 3/2011 | Hatano |
| 2011/0273494 A1 | 11/2011 | Jun |
| 2012/0120043 A1 | 5/2012 | Cho et al. |
| 2013/0057521 A1 | 3/2013 | Kim |
| 2013/0251032 A1 | 9/2013 | Tanaka |
| 2014/0111557 A1 | 4/2014 | Omata et al. |
| 2015/0117774 A1 | 4/2015 | Yang et al. |
| 2015/0138218 A1 | 5/2015 | Jeong et al. |
| 2015/0146978 A1 | 5/2015 | Kato et al. |

FOREIGN PATENT DOCUMENTS

| | | |
|---|---|---|
| KR | 10-2012-0052739 A | 5/2012 |
| KR | 10-2013-0026628 A | 3/2013 |

APPARATUS AND METHOD FOR ENCODING IMAGE DATA

CROSS-REFERENCE TO RELATED APPLICATION

Korean Patent Application No. 10-2013-0130275, filed on Oct. 30, 2013, in the Korean Intellectual Property Office, and entitled: "Apparatus and Method For Encoding Image Data," is incorporated by reference herein in its entirety.

BACKGROUND

1. Field

An aspect of embodiments relates to an apparatus and a method for encoding an image data.

2. Description of the Related Art

Recently, there have been developed various types of flat panel displays capable of reducing the weight and volume of cathode ray tubes, which are disadvantages. Such flat panel displays may include, e.g., a liquid crystal display (LCD), a field emission display (FED), a plasma display panel (PDP), an organic light emitting display (OLED), and the like.

In such flat panel display, each pixel is configured with a plurality of sub-pixels. Generally, a plurality of sub-pixels corresponds to the three primary colors. That is, the plurality of sub-pixels is configured with red, green, and blue sub-pixels.

SUMMARY

Embodiments provide an apparatus and a method for encoding an image data, which can compress an RG-BG type image data without any loss.

According to an aspect of embodiments, there is provided an apparatus for encoding an image data, the apparatus including: a sub-pixel rendering unit configured to convert a first image data of an RGB type, supplied from an outside thereof, into a second image data of an RG-BG type by performing sub-pixel rendering on the first image data; a first differential pulse code modulation (DPCM) processing unit configured to generate a first differential data including a differential value between gray scale values corresponding to green sub-pixels in the second image data; and a second DPCM processing unit configured to generate a second differential data including a differential value between a gray scale value corresponding to a red or blue sub-pixel in the second image data and an average value of gray scale values corresponding to green sub-pixels adjacent to the red or blue sub-pixel.

The second DPCM processing unit may include an average calculation unit configured to calculate the average value of the gray scale values corresponding to the adjacent green sub-pixels; and a subtraction unit configured to generate the second differential data by calculating a differential value between the gray scale value corresponding to the red or blue sub-pixel and the average value.

The apparatus may further include an image processing unit configured to perform image processing on the first image data, in response to an image processing control signal, and output the image-processed first image data to the sub-pixel rendering unit.

When calculating a differential value corresponding to a leftmost sub-pixel, the second DPCM processing unit may calculate, as the differential value corresponding to the leftmost sub-pixel, a difference between a gray scale value corresponding to the leftmost sub-pixel and a gray scale value corresponding to a green sub-pixel adjacent to the right side of the leftmost sub-pixel.

The average value may be an arithmetic mean value of the gray scale values corresponding to the adjacent green sub-pixels.

The average value may be calculated according to the following equation:

$$A_{avg} = \left( \frac{G_{n-1}^{\gamma} + G_n^{\gamma}}{2} \right)^{1/\gamma}. \quad \text{Equation}$$

Here, $A_{avg}$ denotes the average value, $G_{n-1}$ and $G_n$ denote the gray scale values corresponding to the adjacent green sub-pixels, and $\gamma$ denotes a gamma constant.

Each differential value included in the second differential data may be stored using 3 bits or less.

According to an aspect of embodiments, there is provided a method for encoding an image data, the method including: converting a first image data of an RGB type, supplied from an outside, into a second image data of an RG-BG type by performing sub-pixel rendering on the first image data; generating a first differential data including a differential value between gray scale values corresponding to green sub-pixels in the second image data; and generating a second differential data including a differential value between a gray scale value corresponding to a red or blue sub-pixel in the second image data and an average values of gray scale values corresponding to green sub-pixels adjacent to the red or blue sub-pixel.

The converting may include image-processing the first image data, in response to an image processing control signal; and converting the image-processed first image data into the second image data by performing sub-pixel rendering on the first image data.

The differential value corresponding to a leftmost sub-pixel among the red and blue sub-pixels may be a difference between a gray scale value corresponding to the leftmost sub-pixel and a gray scale value corresponding to a green sub-pixel adjacent to the right side of the leftmost sub-pixel.

The average value may be an arithmetic mean value of the gray scale values corresponding to the adjacent green sub-pixels.

The average value may be calculated according to the following equation:

$$A_{avg} = \left( \frac{G_{n-1}^{\gamma} + G_n^{\gamma}}{2} \right)^{1/\gamma}. \quad \text{Equation}$$

Here, $A_{avg}$ denotes the average value, $G_{n-1}$ and $G_n$ denote the gray scale values corresponding to the adjacent green sub-pixels, and $\gamma$ denotes a gamma constant.

Each differential value included in the second differential data may be stored using 3 bits or less.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
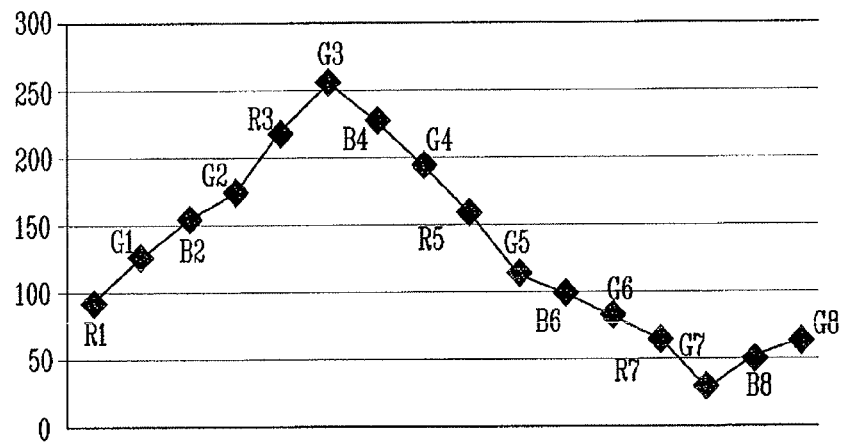
FIG. 1 illustrates a graph of gray scale values when a gray-tone image is converted into an RG-BG type image.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 illustrates a graph of gray scale values when a gray-tone image is converted into a RG-BG type image. If the gray-tone image is converted into a RGB type image, red, green, and blue sub-pixels have gray scale values similar to one another. On the other hand, if the same gray-tone image is converted into a RG-BG type image, the red, green, and blue sub-pixels have gray scale values which are not similar to one another. This is because, in the RG-BG type image, the gray scale values of the sub-pixels are influenced by gray scale values of peripheral pixels due to sub-pixel rendering.

If a gray-tone image is converted into a RG-BG type image, as shown in FIG. 1, a gray scale value R1, B2, R3, B4, etc. corresponding to a red or blue sub-pixel has a value between gray scale values G1, G2, G3, G4, etc. of adjacent green sub-pixels. For example, R3 has a value between G2 and G3, and B4 has a value between G3 and G4. That is, in case of the gray-tone image, the range of a gray scale value corresponding to the red or blue sub-pixel may be limited between gray scale values G1, G2, G3, G4, etc. of adjacent green sub-pixels.

In this specification, the 'gray-tone image' does not mean only a black and white image. That is, in this specification, the 'gray-tone image' includes not only a case where gray scale values corresponding to red, green, and blue sub-pixels are equal to one another when the 'gray-tone image' is converted into a RGB type image, but also a case where the gray scale values corresponding to the red, green, and blue sub-pixels are similar to one another. For example, when the 'gray-tone image' is converted into a RG-BG type image, the gray scale value corresponding to the red or blue sub-pixel, the 'gray-tone image' may mean an image having a value between gray scale values of adjacent green sub-pixels.

Figure 2:
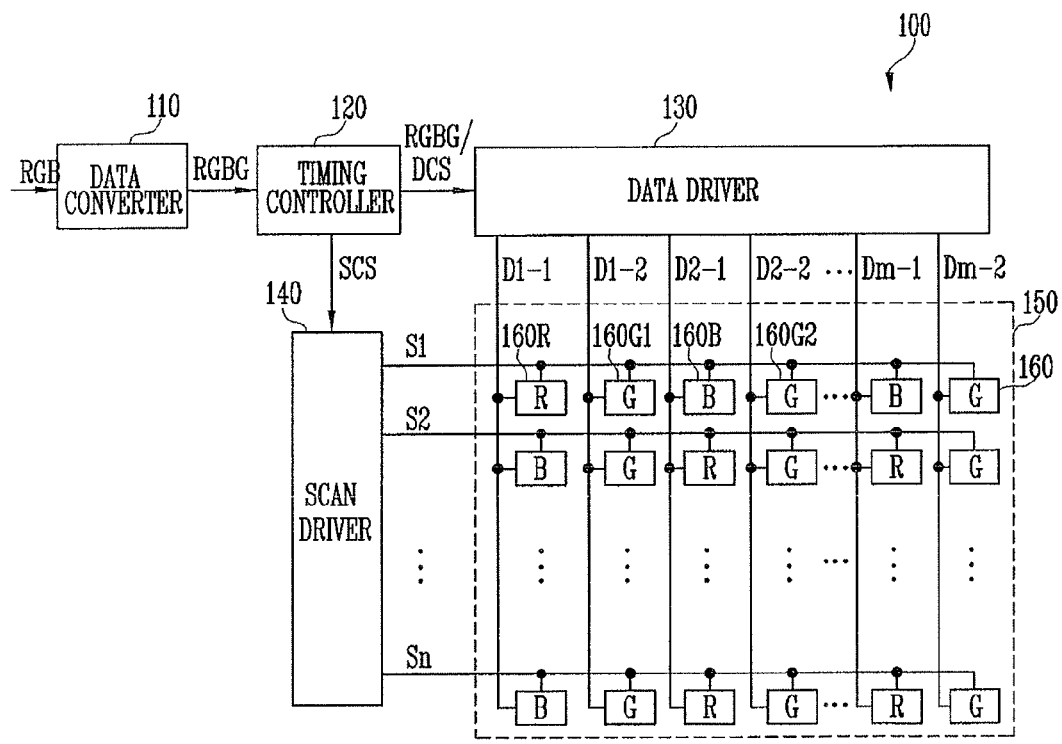
FIG. 2 illustrates a schematic block diagram of a display device according to an embodiment.

FIG. 2 illustrates a block diagram schematically illustrating a display device according to an embodiment.

Referring to FIG. 2, the display device 100 may include a data converter 110, a timing controller 120, a data driver 130, a scan driver 140, and a display unit 150.

The data converter 110 converts a first image data RGB supplied from an outside, e.g., an application processor of a host, into a second image data RGBG. Here, the first image data RGB is a RGB type image, and the second image data RGBG is a RG-BG type image. That is, the first image data RGB is a data type image corresponding to a pixel configured with red, green, and blue sub-pixels, and the second image data RGBG is a data type image corresponding to a pixel configured with any one of red and blue sub-pixels 160R and 160B and a green sub-pixel 160G1 or 160G2.

The data converter 110 converts the first image data RGB configured with the three primary colors into the second image data RGBG corresponding to the arrangement of sub-pixels in the display unit 150. The structure and operation of the data converter 110 will be described in detail with reference to FIG. 3.

The timing controller 120 controls operations of the data driver 130 and the scan driver 140, in response to a synchronization signal (not shown) supplied from an outside thereof. Specifically, the timing controller 120 generates a data driving control signal DCS and supplies the generated data driving control signal DCS to the data driver 130. The timing controller 120 generates a scan driving control signal SCS and supplies the generated scan driving control signal SCS to the scan driver 140.

The timing controller 120 supplies the second image data RGBG supplied from the data converter 110 to the data driver 130, in synchronization with the data driving control signal DCS and the scan driving control signal SCS.

The data driver 130 realigns the second image data RGBG supplied to the timing controller 120, in response to the data driving control signal DCS output from the timing controller 120, and supplies the realigned second image data RGBG as data signals to data lines D1-1 to Dm-1 and D1-2 to Dm-2.

For example, the data driver 130 supplies data signals corresponding to the red sub-pixel 160R or blue sub-pixel 160B through first data lines D1-1 to Dm-1. In addition, the data driver 130 supplies data signals corresponding to the green sub-pixels 160G1 and 160G2 through second data lines D1-2 to Dm-2.

The scan driver 140 progressively supplies a scan signal to scan lines S1 to Sn, in response to the scan driving control signal SCS output from the timing controller 120.

The display unit 150 includes sub-pixels 160R, 160G1, 160B and 160G2 respectively disposed at intersection portions of the data lines D1-1 to Dm-1 and D1-2 to Dm-2 and the scan lines S1 to Sn. Here, the data lines D1-1 to Dm-1 and D1-2 to Dm-2 are arranged in a vertical direction, and the scan lines 51 to Sn are arranged in a horizontal direction. Any one of the red and blue sub-pixels 160R and 160B and the green sub-pixel 160G1 or 160G2 constitute one pixel.

The sub-pixels 160R, 160G1, 160B and 160G2 are coupled to a corresponding data line among the data lines D1-1 to Dm-1 and D1-2 to Dm-2 and a corresponding scan line among the scan lines S1 to Sn. Each sub-pixel 160R, 160G1, 160B or 160G2 emits light with luminance corresponding to a data signal supplied through the corresponding data line among the data lines D1-1 to Dm-1 and D1-2 to Dm-2.

Although it has been illustrated that the data converter 110 and the timing controller 120 are implemented as separate components, the technical spirit of the embodiments are not limited thereto. For example, the data converter 110 and the timing controller 120 may be implemented with one integrated circuit.

Figure 3:
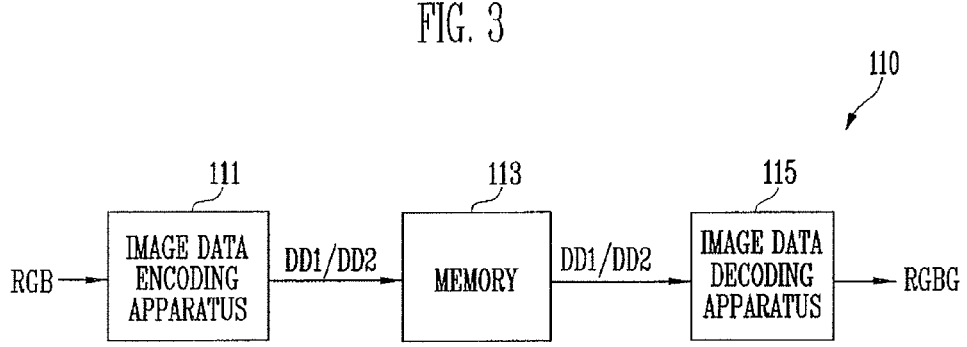
FIG. 3 illustrates a detailed block diagram of a data converter shown in FIG. 2.
Figure 4:
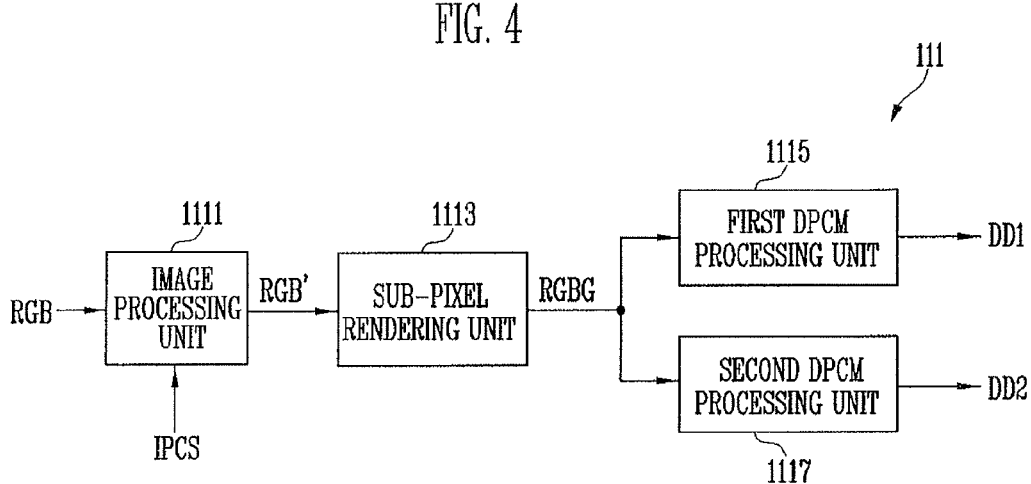
FIG. 4 illustrates a detailed block diagram of an image data encoding apparatus shown in FIG. 3.
Figure 5:
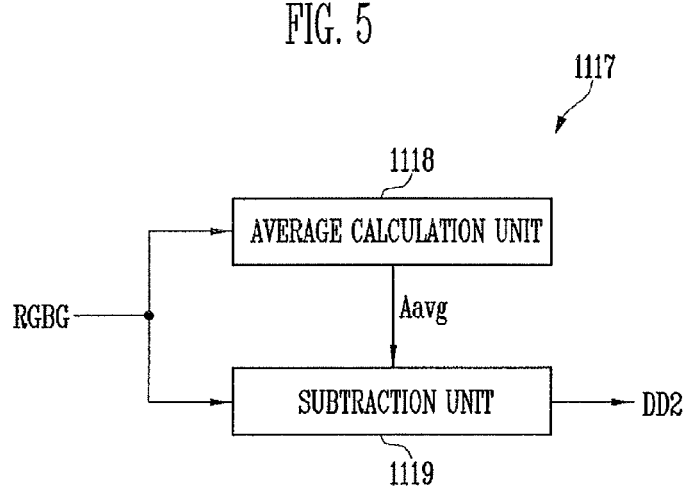
FIG. 5 illustrates a detailed block diagram for a second differential pulse code modulation (DPCM) processing unit shown in FIG. 4.

FIG. 3 illustrates a block diagram illustrating in detail the data converter 110, and FIG. 4 is a block diagram illustrating in detail an image data encoding apparatus in the data converter 110. FIG. 5 is a block diagram illustrating in detail a second differential pulse code modulation (DPCM) processing unit shown in FIG. 4.

Referring to FIG. 3, the data converter 110 may include an image data encoding apparatus 111, a memory 113, and an image data decoding apparatus 115.

The image data encoding apparatus 111 converts the first image data RGB supplied from an outside thereof into a first differential data DD1 and a second differential data DD2. The first differential data DD1 includes differential values corresponding to green sub-pixels 160G1 and 160G2. The second differential data DD2 includes differential values corresponding to red sub-pixels 160R or blue sub-pixels 160B.

Referring to FIG. 4, the image data encoding apparatus 111 may include sub-pixel rendering unit 1113, a first DPCM processing unit 1115, and a second DPCM processing unit 1117.

The sub-pixel rendering unit 1113 converts the first image data RGB into the second image data RGBG by performing sub-pixel rendering on the first image data RGB. In this specification, the 'sub-pixel rendering' means a data processing of converting an original image data to correspond to the arrangement of the sub-pixels in the display unit 150.

The sub-pixel rendering unit 1113 maintains gray scale values corresponding to the green sub-pixels 160G1 and 160G2 as they are. The sub-pixel rendering unit 1113 converts gray scale values corresponding to the red sub-pixels 160R or the blue sub-pixels 160B, using gray scale values corresponding to red sub-pixels 160R or blue sub-pixels 160B of an adjacent pixel. In detail, the sub-pixel rendering unit 1113 converts gray scale values corresponding to the red sub-pixels 160R or the blue sub-pixels 160B according to the following Equation 1.

$$R/B_{pen} = \left(\frac{R/B_{n-1}^{\gamma} + R/B_{n}^{\gamma}}{2}\right)^{1/\gamma} \quad \text{Equation 1}$$

In Equation 1, $R/B_{pen}$ denotes a converted gray scale value, $R/B_{n-1}$ denotes a gray scale value corresponding to the red sub-pixel 160R or the blue sub-pixel 160B of an adjacent pixel, e.g., a left pixel, $R/B_n$ denotes a gray scale value before the conversion, and γ denotes a gamma constant. The gamma constant is determined according to characteristics of the display device 100. The gamma constant is generally 2.2 or 1.8.

In case of a leftmost sub-pixel, no pixel exists at the left of the leftmost sub-pixel, and thus the gray scale value of the leftmost sub-pixel is maintained as it is. For example, the first image data RGB having gray scale values shown in the following Table 1 is converted into the second image data RGBG having gray scale values shown in the following Table 2.

TABLE 1

| RGB type | Pixel 1 | Pixel 2 | Pixel 3 | Pixel 4 | Pixel 5 | Pixel 6 | Pixel 7 | Pixel 8 |
|---|---|---|---|---|---|---|---|---|
| R | 159 | 216 | 255 | 216 | 159 | 96 | 39 | 0 |
| G | 160 | 216 | 255 | 216 | 159 | 96 | 39 | 0 |
| B | 160 | 216 | 255 | 217 | 159 | 95 | 38 | 0 |

TABLE 2

| RGBG type | Pixel 1 | Pixel 2 | Pixel 3 | Pixel 4 | Pixel 5 | Pixel 6 | Pixel 7 | Pixel 8 |
|---|---|---|---|---|---|---|---|---|
| R | 159 | — | 237 | — | 191 | — | 74 | — |
| G | — | 191 | — | 237 | — | 132 | — | 21 |
| B | 160 | 216 | 255 | 216 | 159 | 96 | 39 | 0 |

The first DPCM processing unit 1115 performs DPCM on gray scale values corresponding to the green sub-pixels 160G1 and 160G2 in the second image data RGBG. That is, the first DPCM processing unit 1115 generates the first differential data DD1 including a differential value between the gray scale values corresponding to the green sub-pixels 160G1 and 160G2. For example, the first differential data DD1 on the second image data RGBG having gray scale values shown in Table 2 are shown in the following Table 3.

TABLE 3

| | Pixel 1 | Pixel 2 | Pixel 3 | Pixel 4 | Pixel 5 | Pixel 6 | Pixel 7 | Pixel 8 |
|---|---|---|---|---|---|---|---|---|
| DD1 | (160) | 56 | 39 | −39 | −57 | −63 | −57 | −39 |

Here, '160' in parentheses of pixel 1 means a reference gray scale value. Since pixel 1 is a leftmost pixel, according to an embodiment, the gray scale value of pixel 1 as a value corresponding to the pixel 1 as shown in Table 3 may be stored as it is. According to another embodiment, the differential value between the gray scale value of the pixel 1 and the gray scale value of the last pixel on the previous column may be stored as a value corresponding to the pixel 1.

The second DPCM processing unit 1117 generates a second differential data DD2 corresponding to the red sub-pixels 160R and the blue sub-pixels 160B in the second image data RGBG. In detail, the second DPCM processing unit 1117 generates, as a differential value corresponding to the red sub-pixel 160R, the difference between a gray scale value corresponding to the red sub-pixel 160R and an average value of gray scale values corresponding to the green sub-pixels 160G1 and 160G2 adjacent to the red sub-pixel 160R. The second DPCM processing unit 1117 generates, as a differential value corresponding to the blue sub-pixel 160B, the difference between a gray scale value corresponding to the blue sub-pixel 160B and an average value of gray scale values corresponding to the green sub-pixels 160G1 and 160G2 adjacent to the blue sub-pixel 160B.

The second DPCM processing unit 1117 includes an average calculation unit 1118 and a subtraction unit 1119 (FIG. 5). The average calculation unit 1118 calculates an average value Aavg of gray scale values corresponding to the green sub-pixels 160G1 and 160G2 adjacent to the red sub-pixels 160R or the blue sub-pixels 160B.

In case of a leftmost sub-pixel, no pixel exists at the left of the leftmost sub-pixel, and thus the gray scale value corresponding to the leftmost green sub-pixel substitutes for the average value Aavg. For example, the average value Aavg corresponding to the second image data RGBG shown in Table 2 is shown in the following Table 4.

TABLE 4

| | Pixel 1 | Pixel 2 | Pixel 3 | Pixel 4 | Pixel 5 | Pixel 6 | Pixel 7 | Pixel 8 |
|---|---|---|---|---|---|---|---|---|
| Aavg | 160 | 188 | 235.5 | 235.5 | 187.5 | 67.5 | 19.5 | 19.5 |

Here, the average value Aavg, according to an embodiment, may be a value calculated as the arithmetic mean.

According to another embodiment, the average calculation unit 1118 may calculate the average value Aavg according to the following Equation 2.

$$A_{avg} = \left(\frac{G_{n-1}^{\gamma} + G_n^{\gamma}}{2}\right)^{1/\gamma} \quad \text{Equation 2}$$

In Equation 2, $G_{n-1}$ and $G_n$ denote gray scale values corresponding to the green sub-pixels 160G1 and 160G2 adjacent to the red sub-pixels 160R or the blue sub-pixels 160B, and γ denotes a gamma constant.

The subtraction unit 1119 generates a second differential data DD2 by calculating the average value Aavg calculated by the average calculation unit 1118 and the gray scale values corresponding to the red sub-pixels 160R or the blue sub-pixels 160B. For example, the second differential data on the second image data RGBG shown in Table 2 is shown in the following Table 5.

TABLE 5

|     | Pixel 1 | Pixel 2 | Pixel 3 | Pixel 4 | Pixel 5 | Pixel 6 | Pixel 7 | Pixel 8 |
| --- | --- | --- | --- | --- | --- | --- | --- | --- |
| DD2 | 0 | 3 | 1.5 | 1.5 | 3.5 | 4.5 | 6.5 | 1.5 |

As shown in Table 5, differential values included in the second differential data DD2 have low values. Therefore, the differential value may be stored using a small number of bits, e.g., 3 bits.

The first DPCM processing unit 1115 writes the first differential data DD1 in the memory 113. The second DPCM processing unit 1117 writes the second differential data DD2 in the memory 113. The memory 113 stores the first differential data DD1 and the second differential data DD2.

The image data decoding apparatus 115 reads the first and second differential data DD1 and DD2 stored in the memory 113, and converts the read first and second differential data DD1 and DD2 into the second image data RGBG.

The process in which the image data decoding apparatus 115 converts the first and second differential data DD1 and DD2 into the second image data RGBG corresponds to the inverse process of the process in which the image data encoding apparatus 111 converts the second image data RGBG into the first and second differential data DD1 and DD2, and therefore, its detailed description will be omitted. The image data decoding apparatus 115 outputs the second image data RGBG to the timing controller 120.

According to an embodiment, the image data encoding apparatus 111 may further include an image processing unit 1111. The image processing unit 1111 performs image-processing on a first image data RGB, in response to an image processing control signal IPCS, and outputs an image-processed first image data RGB' to the sub-pixel rendering unit 1113. The image processing control signal IPCS may be supplied from an outside, e.g., an application of a host, or may be supplied from a controller (not shown) of the display device 100. In this specification, the 'image processing' means a process of manipulating an image such as color enhancement or sharpening.

The image processing is performed before the first image data RGB of the RGB type is converted into the second image data RGBG of the RG-BG type, thereby reducing power consumption.

Figure 6:
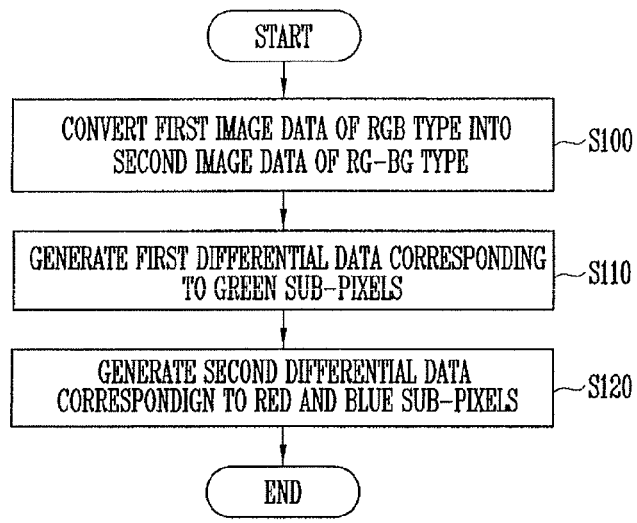
FIG. 6 illustrates a flowchart of an image data encoding method according to an embodiment.
Figure 7:
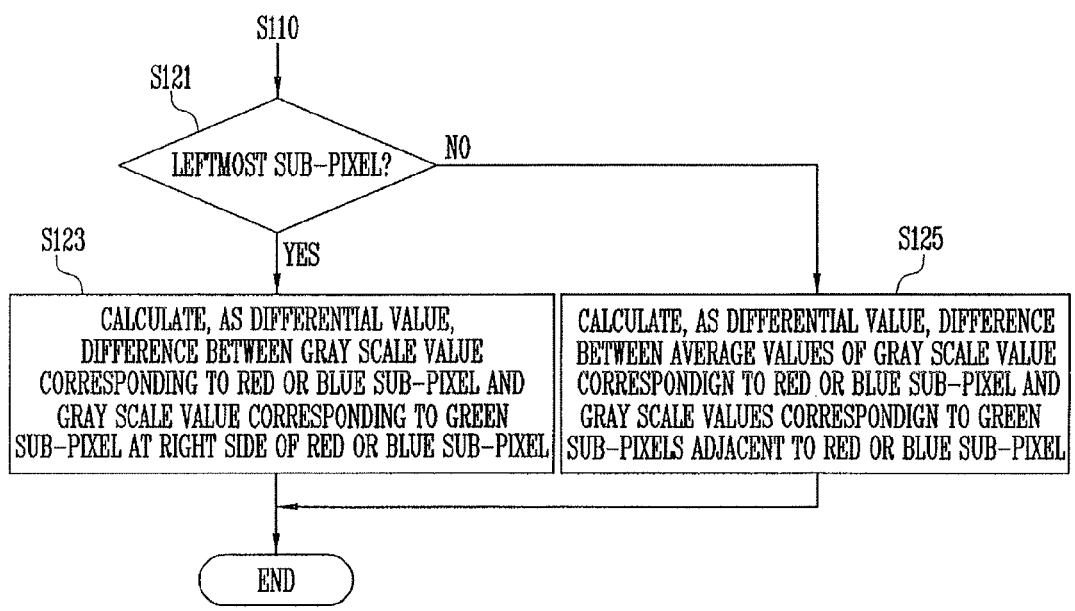
FIG. 7 illustrates a flowchart of a step of generating a second differential data shown in FIG. 6.

FIG. 6 illustrates a flowchart illustrating an image data encoding method according to an embodiment. FIG. 7 is a flowchart illustrating a step of generating a second differential data shown in FIG. 6.

Referring to FIGS. 6 and 7, the image data encoding apparatus 111 converts a first image data RGB of a RGB type into a second image data RGBG of a RG-BG type by performing sub-pixel rendering on the first image data RGB (S100).

The image data encoding apparatus 111 generates a first differential data DD1 corresponding to green sub-pixels 160G1 and 160G2. In detail, the image data encoding apparatus 111 generates a first differential data DD1 including a differential value between gray scale values corresponding to the green sub-pixels 160G1 and 160G2 in the second image data RGBG (S110).

The image data encoding apparatus 111 generates a second differential data DD2 corresponding to red sub-pixels 160R and blue sub-pixels 160B. In detail, the image data encoding apparatus 111 generates a second differential data DD2 including a differential value between a gray scale value corresponding to the red or blue sub-pixel 160R or 160B and the average value of gray scale values corresponding to the green sub-pixels 160G1 and 160G2 adjacent to the red or blue sub-pixel 160R or 160B (S120).

In detail, referring to FIG. 7, the image data encoding apparatus 111 decides whether the red or blue sub-pixel 160R or 160B is a leftmost sub-pixel (S121).

When the red or blue sub-pixel 160R or 160E is the leftmost sub-pixel, the image data encoding apparatus 111 calculates, as the differential value, a difference between a gray scale value corresponding to the red or blue sub-pixel 160R or 160B and a gray scale value corresponding to the green sub-pixel 160G1 or 160G2 at the right side of the red or blue sub-pixel 160R or 160B (S123).

When the red or blue sub-pixel 160R or 160B is not the leftmost sub-pixel, the image data encoding apparatus 111 calculates, as the differential value, a difference between a gray scale value corresponding to the red or blue sub-pixel 160R or 160B and the average value of gray scale values corresponding to the green sub-pixels 160G1 and 160G2 adjacent to the red or blue sub-pixel 160R or 160B (S125).

By way of summation and review, there has recently been developed a sub-pixel arrangement for overcoming limitation of micro fabrication and increasing resolution. For example, in an RG-BG type display, e.g., a pentile display, one pixel is configured with any one of red and blue sub-pixels and a green sub-pixel. However, as the resolution of a display device increases, the amount of data used may increase. If the amount of data increases, power consumption and required memory size may increase. In contrast, in the apparatus and the method for encoding an image data according to embodiments, a RG-BG type image data can be compressed without any loss.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An apparatus for encoding an image data, the apparatus comprising:
  a sub-pixel rendering unit configured to convert a first image data of a RGB type, supplied from an outside thereof, into a second image data of a RG-BG type by performing sub-pixel rendering on the first image data;

a first differential pulse code modulation (DPCM) processing unit configured to generate a first differential data including a differential value between gray scale values corresponding to green sub-pixels in the second image data; and a second DPCM processing unit configured to generate a second differential data including a differential value between a gray scale value corresponding to a red or blue sub-pixel in the second image data and an average value of gray scale values corresponding to green sub-pixels adjacent to the red or blue sub-pixel.

2. The apparatus as claimed in claim 1, wherein the second DPCM processing unit includes:

an average calculation unit configured to calculate the average value of the gray scale values corresponding to the adjacent green sub-pixels; and a subtraction unit configured to generate the second differential data by calculating a differential value between the gray scale value corresponding to the red or blue sub-pixel and the average value.

3. The apparatus as claimed in claim 1, further comprising an image processing unit configured to perform image processing on the first image data, in response to an image processing control signal, and output the image-processed first image data to the sub-pixel rendering unit.

4. The apparatus as claimed in claim 1, wherein, when calculating a differential value corresponding to a leftmost sub-pixel, the second DPCM processing unit calculates, as the differential value corresponding to the leftmost sub-pixel, a difference between a gray scale value corresponding to the leftmost sub-pixel and a gray scale value corresponding to a green sub-pixel adjacent to the right side of the leftmost sub-pixel.

5. The apparatus as claimed in claim 1, wherein the average value is an arithmetic mean value of the gray scale values corresponding to the adjacent green sub-pixels.

6. The apparatus as claimed in claim 1, wherein the average value is calculated according to the following equation:

$$A_{avg} = \left( \frac{G_{n-1}^{\gamma} + G_n^{\gamma}}{2} \right)^{1/\gamma},$$

and wherein $A_{avg}$ denotes the average value, $G_{n-1}$ and $G_n$ denote the gray scale values corresponding to the adjacent green sub-pixels, and $\gamma$ denotes a gamma constant.

7. The apparatus as claimed in claim 1, wherein each differential value included in the second differential data is stored using three bits or less.

8. A method for encoding an image data, the method comprising:

converting a first image data of a RGB type, supplied from an outside, into a second image data of a RG-BG type by performing sub-pixel rendering on the first image data;

generating a first differential data including a differential value between gray scale values corresponding to green sub-pixels in the second image data; and generating a second differential data including a differential value between a gray scale value corresponding to a red or blue sub-pixel in the second image data and an average value of gray scale values corresponding to green sub-pixels adjacent to the red or blue sub-pixel.

9. The method as claimed in claim 8, wherein the converting includes:

image-processing the first image data, in response to an image processing control signal; and converting the image-processed first image data into the second image data by performing sub-pixel rendering on the first image data.

10. The method as claimed in claim 8, wherein the differential value corresponding to a leftmost sub-pixel among the red and blue sub-pixels is a difference between a gray scale value corresponding to the leftmost sub-pixel and a gray scale value corresponding to a green sub-pixel adjacent to the right side of the leftmost sub-pixel.

11. The method as claimed in claim 8, wherein the average value is an arithmetic mean value of the gray scale values corresponding to the adjacent green sub-pixels.

12. The method as claimed in claim 8, wherein the average value is calculated according to the following equation:

$$A_{avg} = \left( \frac{G_{n-1}^{\gamma} + G_n^{\gamma}}{2} \right)^{1/\gamma},$$

and wherein $A_{avg}$ denotes the average value, $G_{n-1}$ and $G_n$ denote the gray scale values corresponding to the adjacent green sub-pixels, and $\gamma$ denotes a gamma constant.

13. The method as claimed in claim 8, wherein each differential value included in the second differential data is stored using three bits or less.

* * * * *